United States Patent
Choi et al.

(10) Patent No.: US 7,991,842 B2
(45) Date of Patent: Aug. 2, 2011

(54) SYSTEM AND METHOD FOR SHARING DATA IN LAN

(75) Inventors: Woo-Jun Choi, Suwon-si (KR); Jae-Ho Kim, Seoul (KR); Jeong-Eun Lee, Seongnam-si (KR); Young-Seop Han, Gyeonggi-do (KR); Dae-Hyun Sim, Seoul (KR)

(73) Assignee: Samsung Electronics Co., Ltd (KR)

( * ) Notice: Subject to any disclaimer, the term of this patent is extended or adjusted under 35 U.S.C. 154(b) by 204 days.

(21) Appl. No.: 12/195,050

(22) Filed: Aug. 20, 2008

(65) Prior Publication Data

US 2009/0055480 A1 Feb. 26, 2009

(30) Foreign Application Priority Data

Aug. 20, 2007 (KR) .......................... 10-2007-0083403

(51) Int. Cl.
 *G06F 15/16* (2006.01)
(52) U.S. Cl. .......................... 709/205; 709/204; 709/207
(58) Field of Classification Search .......... 709/204–207, 709/217–219, 223–224
See application file for complete search history.

(56) References Cited

U.S. PATENT DOCUMENTS

| | | | | |
|---|---|---|---|---|
| 6,880,156 B1* | 4/2005 | Landherr et al. | ............... | 718/105 |
| 7,318,128 B1* | 1/2008 | Dice | ............... | 711/151 |
| 7,398,388 B2* | 7/2008 | Xu et al. | ............... | 713/163 |
| 2002/0036504 A1* | 3/2002 | Troy et al. | ............... | 324/430 |
| 2003/0188242 A1* | 10/2003 | Ishizuka et al. | ............... | 714/727 |
| 2005/0086384 A1* | 4/2005 | Ernst | ............... | 709/248 |
| 2005/0193113 A1* | 9/2005 | Kokusho et al. | ............... | 709/225 |
| 2007/0214383 A1* | 9/2007 | Brown et al. | ............... | 714/7 |
| 2008/0005195 A1* | 1/2008 | Li | ............... | 707/203 |

FOREIGN PATENT DOCUMENTS

| | | |
|---|---|---|
| JP | 2001-352291 | 12/2001 |
| JP | 2002-345039 | 11/2002 |
| KR | 10-0370605 | 1/2003 |
| KR | 10-0697058 | 3/2007 |

\* cited by examiner

*Primary Examiner* — Faruk Hamza
(74) *Attorney, Agent, or Firm* — The Farrell Law Firm, P.C.

(57) ABSTRACT

Provided is a method for sharing data between at least two terminals over a LAN, in which a first terminal requests for information on whether to hold shared data to a terminal connected to the LAN, receives the information on whether to hold the shared data from the terminal, collects the information on whether to hold the shared data received from the terminal, identifies a total degree of sharing using the collected information on whether to hold the shared data, and determines a method for transmitting the shared data according to the identified total degree of sharing.

24 Claims, 8 Drawing Sheets

| | DATA TRANSMISSION LIST OF EACH LOCAL COMMUNICATION TERMINAL | | | |
|---|---|---|---|---|
| | FIRST LOCAL COMMUNICATION TERMINAL | SECOND LOCAL COMMUNICATION TERMINAL | THIRD LOCAL COMMUNICATION TERMINAL | FOURTH LOCAL COMMUNICATION TERMINAL |
| FIRST LOCAL COMMUNICATION TERMINAL | | HOLDS | HOLDS | NOT HOLDS |
| SECOND LOCAL COMMUNICATION TERMINAL | HOLDS | | NOT HOLDS | NOT HOLDS |
| THIRD LOCAL COMMUNICATION TERMINAL | NOT HOLDS | HOLDS | | HOLDS |
| FOURTH LOCAL COMMUNICATION TERMINAL | NOT HOLDS | NOT HOLDS | NOT HOLDS | |

(DATA HOLDING LIST OF EACH LOCAL COMMUNICATION TERMINAL) ~301

| | DATA TRANSMISSION LIST OF EACH LOCAL COMMUNICATION TERMINAL | | | |
|---|---|---|---|---|
| | FIRST LOCAL COMMUNICATION TERMINAL | SECOND LOCAL COMMUNICATION TERMINAL | THIRD LOCAL COMMUNICATION TERMINAL | FOURTH LOCAL COMMUNICATION TERMINAL |
| FIRST LOCAL COMMUNICATION TERMINAL | | HOLDS | HOLDS | HOLDS |
| SECOND LOCAL COMMUNICATION TERMINAL | HOLDS | | HOLDS | HOLDS |
| THIRD LOCAL COMMUNICATION TERMINAL | NOT HOLDS | HOLDS | | HOLDS |
| FOURTH LOCAL COMMUNICATION TERMINAL | HOLDS | HOLDS | NOT HOLDS | |

(DATA HOLDING LIST OF EACH LOCAL COMMUNICATION TERMINAL) ~303

FIG.3

SYSTEM AND METHOD FOR SHARING DATA IN LAN

PRIORITY

This application claims priority under 35 U.S.C. §119(a) to a Korean Patent Application entitled "System and Method for Sharing Data in LAN" filed in the Korean Industrial Property Office on Aug. 20, 2007 and assigned Serial No. 2007-83403, the contents of which are incorporated herein by reference.

BACKGROUND OF THE INVENTION

1. Field of the Invention

The present invention relates to a Local Area Network (LAN), and more particularly, to a system and method for sharing optional data by multiple local communication terminals in a LAN.

2. Description of the Related Art

Usually, the term "LAN" refers to forming a communication network by connecting multiple local communication terminals to one another for communication. The local communication terminal refers to a terminal that supports local area communication. To describe the local communication terminal in more detail, the local communication terminal can perform local area communication with another local communication terminal by using either ZIGBEE® communication, BLUETOOTH® communication, Ultra-WideBand (UWB) communication, or other types of communication. ZIGBEE® and BLUETOOTH®, as used herein, each refer to specifications for suites of communication protocols for Wireless Personal Area Networks (WPANs). For example, by using the ZIGBEE® communication, local communication terminals supporting the local area communication can perform local area communication with one another in a ZIGBEE® communication scheme.

Currently, in a LAN, when there exists data that each of local communication terminals should share with one another, each of the local communication terminals determines whether the local communication terminal holds the data. A local communication terminal that determines that the local communication terminal does not hold the data receives data corresponding to the determined non-held data from another local communication terminal that holds the data corresponding to the determined non-held data, and stores the received data therein. Accordingly, an optional local communication terminal can hold the data.

A more detailed description will be made with reference to FIG. 1. It is assumed in FIG. 1 that local communication terminals 101, 103, 105, and 107 perform the local area communication by using either ZIGBEE®, BLUETOOTH®, UWB, or other communication schemes.

Also, in FIG. 1, the first local communication terminal 101 is assumed to be a coordinator for generating a LAN, and the second, third, and fourth local communication terminals 103, 105, and 107 are assumed to be nodes in the LAN.

So that each of the second, third, and fourth local communication terminals 103, 105, and 107 may share data held by each of the local communication terminals with one another, the first local communication terminal 101 receives data list information from each of the second, third, and fourth local communication terminals 103, 105, and 107. Herein, the data list information is information necessary to identify data held by an optional local communication terminal.

Also, by using the received data list information, the first local communication terminal 101 determines whether there exists non-held data that the first local communication terminal does not hold, and finds local communication terminals holding the determined non-held data from among the second, third, and fourth local communication terminals 103, 105, and 107. In order to hold the determined non-held data, the first local communication terminal 101 requests each of the found local communication terminals to transmit data corresponding to the determined non-held data, and receives the data transmitted from each of the found local communication terminals and stores the received data therein.

In the same manner, the second local communication terminal 103 uses data list information received from the first, third, and fourth local communication terminals 101, 105, and 107 to determine whether there exists data (i.e. non-held data) that the second local communication terminal does not hold, and receives data corresponding to the determined non-held data and stores the received data therein. Also, each of the third and fourth local communication terminals 105 and 107 goes through the same process as described above, and holds non-held data. Accordingly, the first, second, third, and fourth local communication terminals 101, 103, 105, and 107, constructing the LAN, share optional data.

However, in order to share data by the local communication terminals, an optional local communication terminal requests each of the other local communication terminals to transmit data corresponding to non-held data, and receives the data transmitted from each of the other local communication terminals, which increases a transmission time of the data.

Moreover, in order to share the data by the local communication terminals, the optional local communication terminal requests each of the other local communication terminals to transmit the data corresponding to the non-held data, and receives the data transmitted from each of the other local communication terminals, which increases traffic of a network.

SUMMARY OF THE INVENTION

Accordingly, the present invention has been made to solve the above-stated problems occurring in the prior art, and the present invention provides a system and a method for minimizing a transmission time of data when sharing data over a Local Area Network (LAN).

Also, the present invention provides a system and a method for minimizing data traffic when sharing data over a LAN.

In accordance with an aspect of the present invention, there is provided a method for sharing data between at least two terminals over a Local Area Network (LAN), including requesting for information on whether to hold shared data to a terminal connected to the LAN by a first terminal connected to the LAN; receiving the information on whether to hold the shared data from the terminal; collecting the information on whether to hold the shared data received from the terminal and identifying a total degree of sharing using the collected information on whether to hold the shared data; and determining a method for transmitting the shared data according to the identified total degree of sharing.

In accordance with another aspect of the present invention, there is provided a method for sharing data between at least two terminals over a LAN, including receiving a request for information on whether to hold shared data from a first terminal connected to the LAN; transmitting the information on whether to hold shared data of a terminal to the first terminal according to the request; receiving the shared data of the terminal connected to the LAN from the first terminal and renewing the shared data held by the terminal; receiving the collected information on whether to hold the shared data of the total terminals connected to the LAN from the first terminal and comparing the collected information on whether to hold the shared data with the shared data held by the terminal; and transmitting a message for requesting the shared data to another terminal holding the data that the terminal does not hold according to the comparison result.

BRIEF DESCRIPTION OF THE DRAWINGS

The above and other exemplary features, aspects, and advantages of the present invention will be more apparent from the following detailed description taken in conjunction with the accompanying drawings, in which:

FIG. 3 is an illustrative view showing information on a data holding list and a data transmission list for each local communication terminal according to an exemplary embodiment of the present invention;

DETAILED DESCRIPTION OF THE EXEMPLARY EMBODIMENTS

Hereinafter, exemplary embodiments of the present invention will be described in detail with reference to the accompanying drawings. Also, in the following description of the present invention, a detailed description of known functions and configurations incorporated herein will be omitted when it may make the subject matter of the present invention rather unclear.

Figure 1:
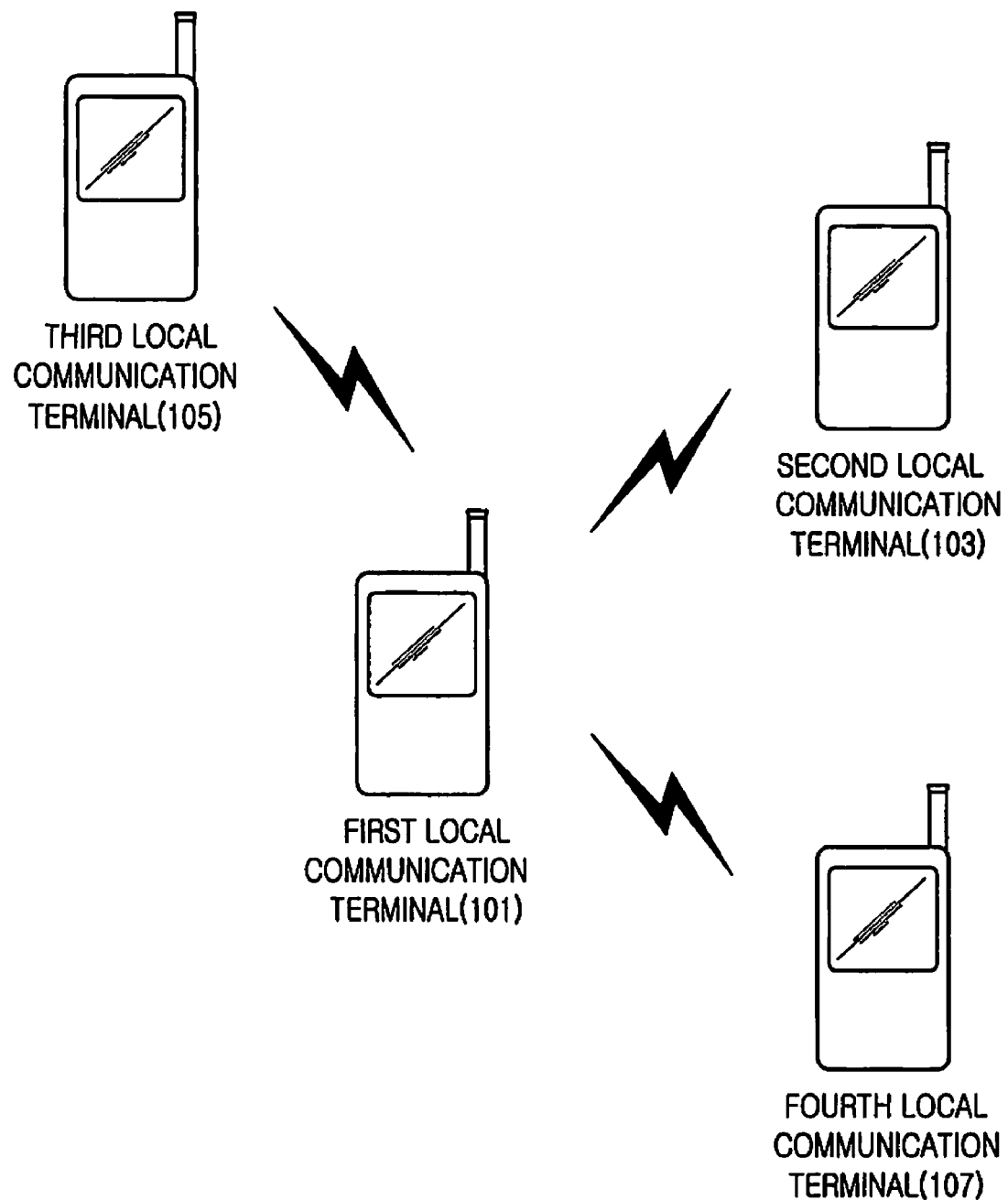
FIG. 1 is an illustrative view showing the configuration of a LAN according to the prior art.

A process of sharing data in a LAN will be described with reference to FIG. 1. In FIG. 1, it is assumed that the LAN is constructed by a first local communication terminal 101, a second communication terminal 103, a third local communication terminal 105, and a fourth local communication terminal 107.

Herein, it is assumed that the first, second, third, and fourth local communication terminals 101, 103, 105, and 107 perform local area communication by using either ZIGBEE®, BLUETOOTH®, UWB, or other communication schemes. Also, the first local communication terminal 101 is assumed to be a coordinator for generating a LAN, and the second, third and fourth local communication terminals 103, 105, and 107 are assumed to be nodes in the LAN. The first, second, third, and fourth local communication terminals 101, 103, 105, and 107 can share only some of the data currently stored in the local communication terminals. Nevertheless, for a simple description of the present invention, it is assumed that the local communication terminals share all of the data currently stored in the local communication terminals.

In the exemplary embodiment of the present invention, each of the first, second, third, and fourth local communication terminals 101, 103, 105, and 107 generates data list information necessary to identify data currently stored in each of the local communication terminals.

Herein, the data can be configured in the same format. For example, when the data is name card data, all of the name card data can be configured in a format including a name, an address, a telephone number, and a version of a name card.

Also, the data list information is information necessary to identify data currently stored in an optional local communication terminal, and is generated by each local communication terminal. For example, the first local communication terminal 101 can generate first data list information necessary to identify first data currently stored in the first local communication terminal 101, and the second local communication terminal 103 can generate second data list information necessary to identify second data currently stored in the second local communication terminal 103. Also, when the first and second data are first and second name card data, respectively, each of the first and second data list information corresponding to the first and second name card data can include names and versions of name cards.

Also, the first local communication terminal 101 receives data list information from each of the second, third, and fourth local communication terminals 103, 105, and 107, and generates information on a data holding list for each local communication terminal by using the received data list information and data list information of the first local communication terminal 101. Herein, the information on the data holding list for each local communication terminal is information for indicating data held by each of the first, second, third, and fourth local communication terminals 101, 103, 105, and 107 among all data held by the first, second, third, and fourth local communication terminals 101, 103, 105, and 107. The information on the data holding list for each local communication terminal will be described in detail referring to FIG. 3.

The first local communication terminal 101 calculates a data holding ratio of the first, second, third, and fourth local communication terminals 101, 103, 105, and 107, which represents a degree of sharing between the terminals, by using the information on the data holding list for each local communication terminal. For example, the first local communication terminal 101 can calculate both a maximum number of data units held by the first, second, third, and fourth local communication terminals 101, 103, 105 and 107, and a current number of data units held by the local communication terminals. Then, the first local communication terminal 101 can calculate a data holding ratio by dividing the current number of the held data units by the maximum number of the held data units. Then, the first local communication terminal 101 compares the calculated data holding ratio with a predetermined reference data holding ratio.

If the calculated data holding ratio is less than the reference data holding ratio, by using the information on the data holding list for each local communication terminal, the first local communication terminal 101 checks non-held data thereof among data held by the second, third, and fourth local communication terminals 103, 105 and 107. Then, the first local communication terminal 101 checks a local communication terminal currently holding the checked the non-held data thereof among the second, third, and fourth local communication terminals 103, 105 and 107, and receives data corresponding to the checked non-held data from the checked local communication terminal and stores the received data therein. Accordingly, the first local communication terminal 101 holds all data held by the first, second, third, and fourth local communication terminals 101, 103, 105, and 107. Then, the first local communication terminal 101 transmits all of the data held by the first, second, third, and fourth local communication terminals 101, 103, 105 and 107, and the information on the data holding list for each local communication terminal to the second, third, and fourth local communication terminals 103, 105, and 107.

Thereafter, by using the information on the data holding list for each local communication terminal, each of the second, third, and fourth local communication terminals 103, 105, and 107 checks for data (i.e. non-held data) that is not currently held by the local communication terminal, finds only data corresponding to the checked non-held data from among the transmitted all of the data held by the first, second, third, and fourth local communication terminals 101, 103, 105 and 107, and stores the found data therein. Accordingly, the first, second, third, and fourth local communication terminals 101, 103, 105, and 107 share all of the data held by the first, second, third, and fourth local communication terminals 101, 103, 105, and 107.

However, if the calculated data holding ratio is greater than or equal to the reference data holding ratio, the first local communication terminal 101 transmits the information on the data holding list for each local communication terminal to the second, third, and fourth local communication terminals 103, 105, and 107. Then, by using the information on the data holding list for each local communication terminal, each of the second, third, and fourth local communication terminals 103, 105, and 107 checks non-held data, and finds local communication terminals holding the checked non-held data. Then, each of the second, third, and fourth local communication terminals 103, 105, and 107 receives data corresponding to the checked non-held data from the found local communication terminals, and stores the received data, thereby holding all of the data held by the first, second, third, and fourth local communication terminals 101, 103, 105, and 107. Accordingly, the first, second, third, and fourth local communication terminals 101, 103, 105, and 107 share all of the data held by the first, second, third, and fourth local communication terminals 101, 103, 105, and 107.

Figure 2:
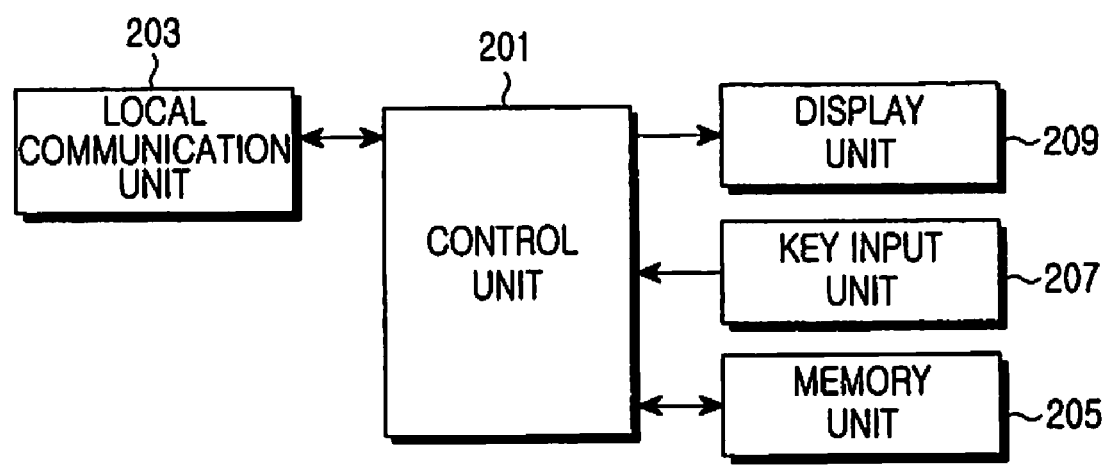
FIG. 2 is a block diagram illustrating the configuration of a local communication terminal according to an exemplary embodiment of the present invention.

FIG. 2 is a block diagram illustrating the configuration of a local communication terminal according to an exemplary embodiment of the present invention. Referring to FIG. 2, the local communication terminal includes a control unit 201, a local communication unit 203, a memory unit 205, a key input unit 207, and a display unit 209.

Herein, the local communication unit 203 performs local area communication, and receives data from another local communication terminal, or transmits data stored in the memory unit 205 to another local communication terminal.

The memory unit 205 stores therein data necessary to control the local communication terminal. Particularly, in the exemplary embodiment of the present invention, the memory unit 205 stores therein data transmitted from another local communication terminal according to the control of the control unit 201. Herein, the stored data corresponds to all possible data (e.g. name card data, etc.) configured in a predetermined format.

The key input unit 207 includes function keys for performing the function of the local communication terminal. Accordingly, the key input unit 207 generates a key signal responding to a key pressed by a user, and outputs the generated key signal to the control unit 201. The display unit 209 displays a current state and an operational state of the local communication terminal according to the control of the control unit 201, and can be configured usually by a Liquid Crystal Display (LCD) or Organic Light-Emitting Diodes (OLED).

The control unit 201 controls each configuration unit of the local communication terminal in order to provide the function of the local communication terminal.

Particularly, in the exemplary embodiment of the present invention, when the local communication terminal is a coordinator of a network, the control unit 201 generates data list information necessary to identify data stored in the memory unit 205. Then, the control unit 201 receives data list information from each of other local communication terminals constructing the LAN, and generates information on a data holding list for each local communication terminal by using the received data list information. Then, the control unit 201 calculates a data holding ratio by using the generated information on the data holding list for each local communication terminal, and compares the calculated data holding ratio with a predetermined reference data holding ratio.

If the calculated data holding ratio is less than the predetermined reference data holding ratio, by using the information on the data holding list for each local communication terminal, the control unit 201 checks data (i.e. non-held data) that is not held by the local communication terminal, and finds a local communication terminal holding the checked non-held data from among other local communication terminals. Then, the control unit 201 receives data corresponding to the checked non-held data from the found local communication terminal, and stores the received data in the memory unit 205. As a result, the relevant local communication terminal including the control unit 201 holds all data held by local communication terminals constructing the LAN. Thereafter, the control unit 201 transmits, to the other communication terminals, both the information on the data holding list for each local communication terminal and all of the data held by the local communication terminals constructing the LAN.

However, if the calculated data holding ratio is greater than or equal to the predetermined reference data holding ratio, the control unit 201 transmits the information on the data holding list for each local communication terminal to other local communication terminals. Then, by using the information on the data holding list for each local communication terminal, the control unit 201 checks data (i.e., non-held data) that is not held by the relevant local communication terminal including the control unit 201, and finds a local communication terminal holding the checked non-held data. Thereafter, the control unit 201 receives data corresponding to the checked non-held data from the found local communication terminal, and stores the received data in the memory unit 205. As a result, the relevant local communication terminal including the control unit 201 holds all data held by local communication terminals constructing the LAN.

Also, when the relevant local communication terminal is a node of the LAN, the control unit 201 generates data list information necessary to identify data stored in the memory unit 205, and transmits the generated data list information to a local communication terminal corresponding to a coordinator of the LAN.

Thereafter, when receiving both information on a data holding list for each local communication terminal and all data held by local communication terminals, by using the received information on the data holding list for each local communication terminal, the control unit 201 checks non-held data, finds data corresponding to the checked non-held data from among all of the received data held by the local communication terminals, and then stores the found data in the memory unit 205. As a result, the relevant local communication terminal including the control unit 201 holds all of the data held by the local communication terminals.

When receiving only the information on the data holding list for each local communication terminal, by using the received information on the data holding list for each local communication terminal, the control unit 201 checks non-held data, and finds a local communication terminal holding the checked non-held data from among other local communication terminals. Then, the control unit 201 receives data corresponding to the checked non-held data from the found local communication terminal, and stores the received data in the memory unit 205. As a result, the relevant local communication terminal including the control unit 201 holds all of the data held by the local communication terminals.

Hence, can share all of the data held by the local communication terminals included in the LAN.

FIG. 3 is an illustrative view showing information on a data holding list and a data transmission list for each local communication terminal according to an exemplary embodiment of the present invention.

For a simple description of the exemplary embodiment of the present invention, it is assumed that the LAN is constructed by the first, second, third, and fourth local communication terminals 101, 103, 105, and 107.

Information on a data holding list for each local communication terminal is generated as shown in a table designated by reference numeral 301 in conditions as follows: the first local communication terminal 101 holds data held by the second local communication terminal 103 and data held by the third local communication terminal 105; the second local communication terminal 103 holds data held by the first local communication terminal 101; the third local communication terminal 105 holds the data held by the second local communication terminal 103 and data held by the fourth local communication terminal 107; and the fourth local communication terminal 107 does not hold any data among the data held by the first, second, and third local communication terminals 101, 103, and 105.

When calculating a data holding ratio by using the information on the data holding list for each local communication terminal as shown in the table numbered 301, the calculation is carried out on a maximum number of data units held by the first, second, third, and fourth local communication terminals 101, 103, 105 and 107, and a current number of data units held by the first, second, third, and fourth local communication terminals 101, 103, 105 and 107. Also, a data holding ratio is calculated by dividing the current number of held data units by the maximum number of held data units.

At this time, a maximum number of data units held by the first, second, third, and fourth local communication terminals 101, 103, 105 and 107 can be calculated by using Equation (1) below.

a maximum number of data units held by local communication terminals=(the number of the local communication terminals−1)×the number of the local communication terminals       (1)

wherein the number of the local communication terminals represents the number of local communication terminals constructing the LAN.

For example, when calculating a maximum number of data units held by the local communication terminals by using the information on the data holding list for each local communication terminal as shown in the table numbered 301, the calculated maximum number is twelve. Also, the calculated current number of data units held by the local communication terminals is five, since, in the information on the data holding list for each local communication terminal as shown in the table numbered 301, the first local communication terminal 101 holds data held by the second local communication terminal 103 and data held by the third local communication terminal 105; the second local communication terminal 103 holds data held by the first local communication terminal 101; the third local communication terminal 105 holds the data held by the second local communication terminal 103 and data held by the fourth local communication terminal 107; and the fourth local communication terminal 107 does not hold any data among the data held by the first, second, and third local communication terminals 101, 103, and 105. Also, by dividing the current number of held data units calculated as five by the maximum number of held data units calculated as twelve, the calculated data holding ratio is 0.417.

Information on a data holding list for each local communication terminal is generated as shown in a table designated by reference numeral 303 in conditions as follows: the first local communication terminal 101 holds second data held by the second local communication terminal 103, third data held by the third local communication terminal 105, and fourth data held by the fourth local communication terminal 107; the second local communication terminal 103 holds first data held by the first local communication terminal 101, the third data held by the third local communication terminal 105, and the fourth data held by the fourth local communication terminal 107; the third local communication terminal 105 holds the second data held by the second local communication terminal 103 and the fourth data held by the fourth local communication terminal 107; and the fourth local communication terminal 107 holds the first data held by the first local communication terminal 101 and the second data held by the second local communication terminal 103.

When calculating a data holding ratio by using the information on the data holding list for each local communication terminal as shown in the table numbered 303, since a maximum number of data units held by the local communication terminals is calculated as twelve and the calculated current number of data units held by the is ten, by dividing the calculated current number of held data units (ten) by the calculated maximum number of held data units (twelve), the calculated data holding ratio is 0.833.

Figure 4A:
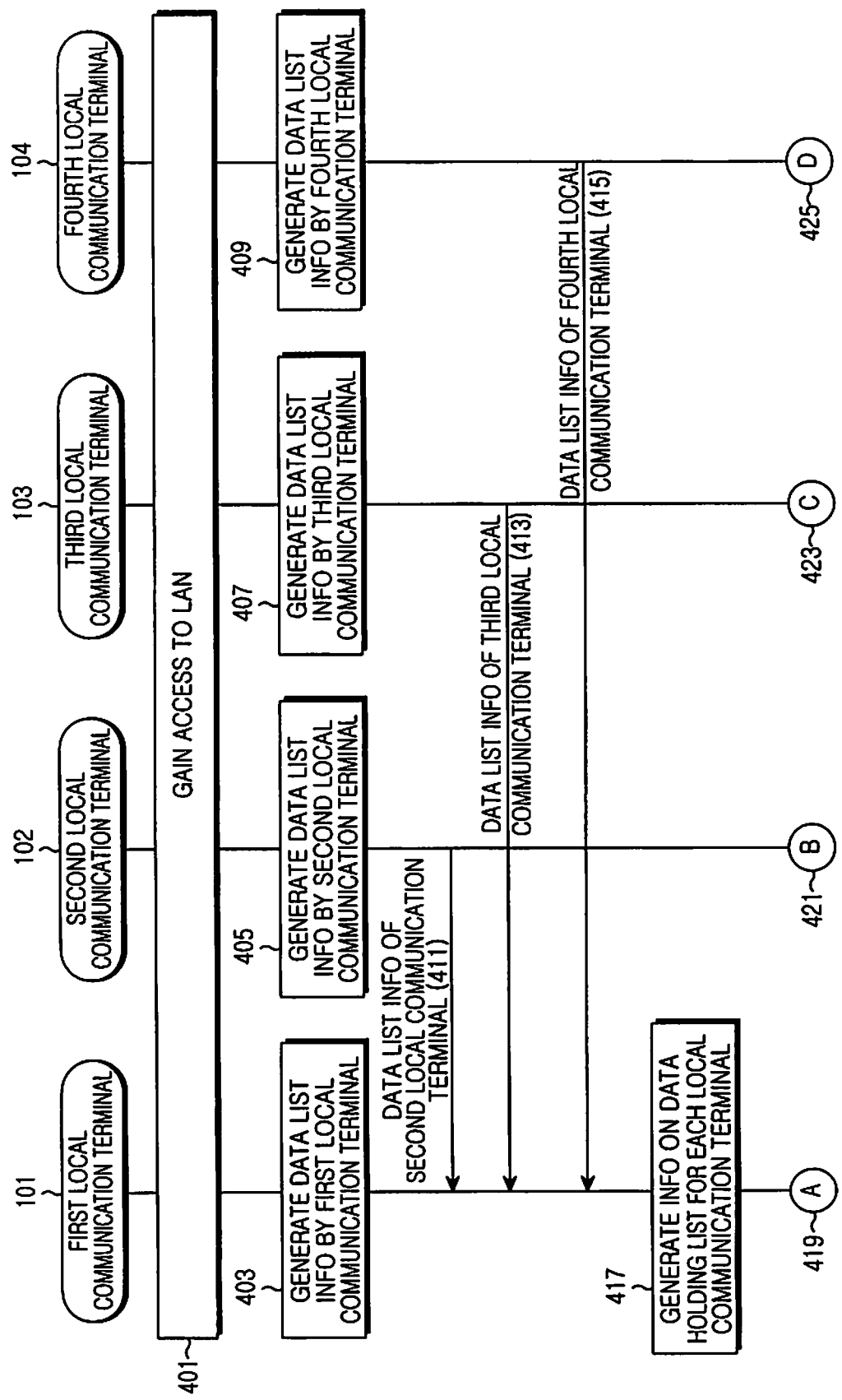
FIG. 4A is a flow diagram illustrating sharing of data in the LAN according to an exemplary embodiment of the present invention.
Figure 4B:
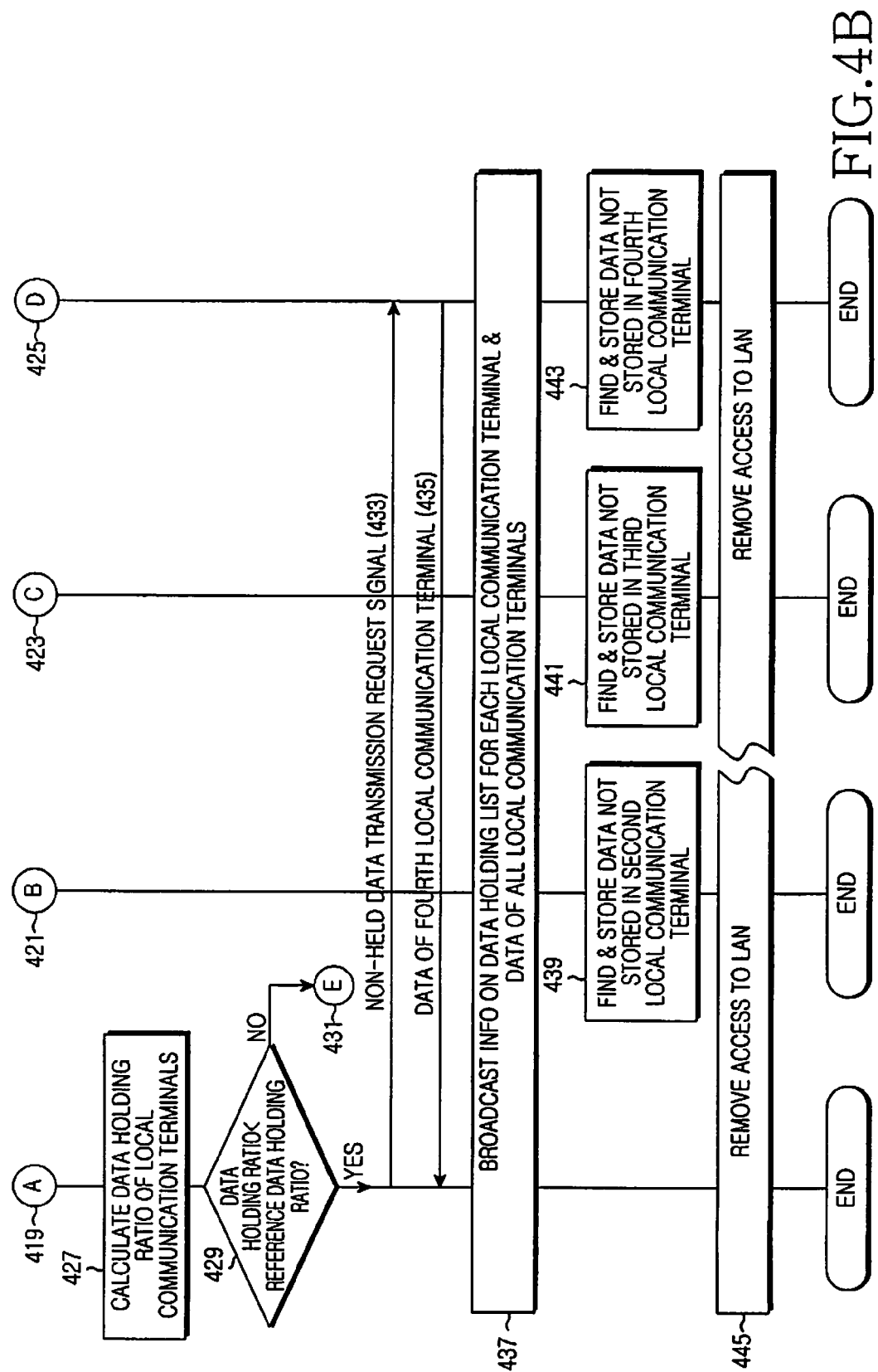
FIG. 4B is a flow diagram illustrating sharing of data in the LAN according to an exemplary embodiment of the present invention.
Figure 4C:
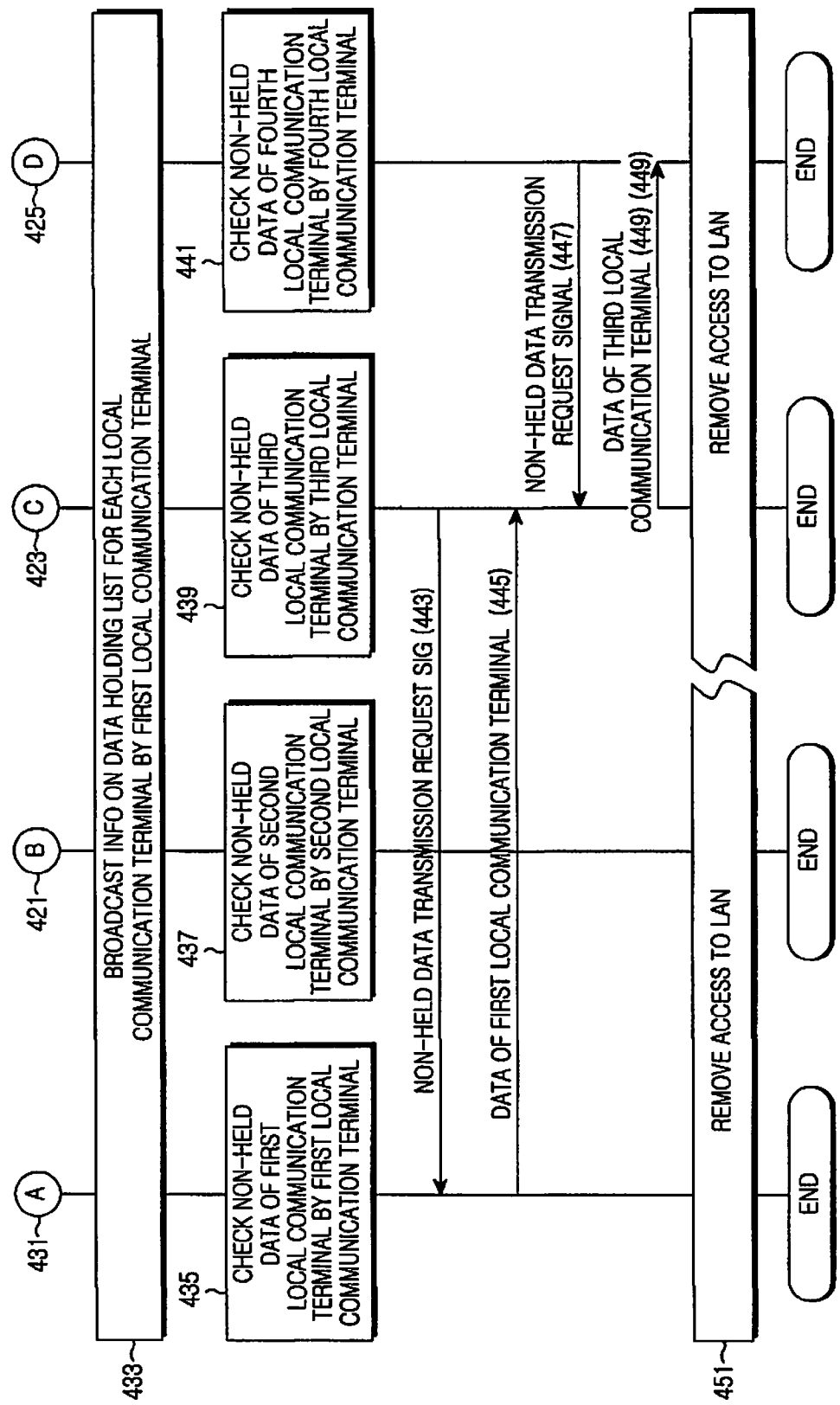
FIG. 4C is a flow diagram illustrating sharing of data in the LAN according to an exemplary embodiment of the present invention.

FIGS. 4A to 4C are flow diagrams illustrating sharing of data in the LAN according to an exemplary embodiment of the present invention.

In step 401, first, second, third, and fourth local communication terminals 101, 103, 105, and 107 construct a LAN in order to share data, and proceed to step 403. At this time, the first local communication terminal 101 is assumed to be a coordinator of the LAN, and the second, third and fourth local communication terminals 103, 105 and 107 are assumed to be nodes of the LAN.

In steps 403 to 409, each of the first, second, third, and fourth local communication terminals 101, 103, 105, and 107 generates data list information necessary to indicate a list of data currently held by it.

Herein, data held by the first, second, third, and fourth local communication terminals 101, 103, 105, and 107 can be configured in a predetermined format, and each of the local communication terminals can generate the data list information according to a format of the data. For example, when the data is name card data, optional name card data can be configured in such a predetermined format as to include a name, an address, a telephone number, and a version of a name card. Also, when generating name card data list information equivalent to the optional name card data, each of the first, second, third, and fourth local communication terminals 101, 103, 105, and 107 can generate the name card data list information including a name and a version of a name card.

In steps 411 to 415, each of the second, third, and fourth local communication terminals 103, 105, and 107 (hereinafter, referred to as "node local communication terminals") corresponding to nodes of the LAN among the first, second, third, and fourth local communication terminals 101, 103, 105, and 107 transmits data list information thereof to the first local communication terminal 101 corresponding to the coordinator of the LAN.

In step 417, the first local communication terminal 101 compares data list information transmitted from each of node local communication terminals 103, 105 and 107 with data list information thereof, collects comparative results and generates information on a data holding list for each local communication terminal, and then proceeds to step 427.

For example, the first local communication terminal 101 compares respective data list information (hereinafter, referred to as "second data list," "third data list information," and "fourth data list information,") of the node local communication terminals 103, 105 and 107 with data list information thereof (hereinafter, referred to as "first data list information"), and generates a list of data held by the first local communication terminal 101.

At this time, with the first data list information as reference, the first local communication terminal 101 compares each of the second, third, and fourth data list information with the first data list information, and generates information on a data holding list of the first local communication terminal 101. If the first data list information is determined to include the second data list information based on a result of comparing the second data list information with the first data list information, the first local communication terminal 101 is checked to determine whether the first local communication terminal 101 holds the data of the second local communication terminal 103. However, if the first data list information is determined not to include the second data list information, the first local communication terminal 101 is determined not to hold the data of the second local communication terminal 103. Then, by comparing the third data list information with the first data list information, the first local communication terminal 101 can determine whether the first local communication terminal 101 holds the data of the third local communication terminal 105. Then, by comparing the fourth data list information with the first data list information, the first local communication terminal 101 can determine whether the first local communication terminal 101 holds the data of the fourth local communication terminal 107. Then, the first local communication terminal 101 generates information on a data holding list thereof based on determining whether the local communication terminal 101 holds the data.

Then, with the second data list information as reference, the first local communication terminal 101 compares each of the first, third, and fourth data list information with the second data list information, and generates information on a data holding list of the second local communication terminal 103. By repeating the same process as described above, the first local communication terminal 101 generates information on a data holding list of the third local communication terminal 105 and information on a data holding list of the fourth local communication terminal 107.

Thereafter, the first local communication terminal 101 collects generated information on data holding lists of the first, second, third, and fourth local communication terminals 101, 103, 105, and 107, and generates information on a data holding list for each local communication terminal.

In step 427, by using the information on the data holding list for each local communication terminal, the first local communication terminal 101 calculates a maximum number of data units held by the first, second, third, and fourth local communication terminals 101, 103, 105, and 107, and a current number of data units held by the first, second, third, and fourth local communication terminals 101, 103, 105, and 107. Then, by dividing the calculated current number of held data units by the calculated maximum number of held data units, the first local communication terminal 101 calculates a data holding ratio of the first, second, third, and fourth local communication terminals 101, 103, 105, and 107.

In step 429, the first local communication terminal 101 compares the calculated data holding ratio with a predetermined reference data holding ratio. If the calculated data holding ratio is less than the predetermined reference data holding ratio, the first local communication terminal 101 proceeds to step 433. However, if the calculated data holding ratio is equal to or greater than the predetermined reference data holding ratio, the first local communication terminal 101 proceeds to step 431.

At step 433, by using the information on the data holding list for each local communication terminal, the first local communication terminal 101 checks non-held data thereof, and finds a local communication terminal holding the checked non-held data from among the node local communication terminals 103, 105, and 107. Then, the first local communication terminal 101 generates a non-held data transmission request signal, and transmits the generated non-held data transmission request signal.

For example, when the first local communication terminal 101 does not hold the data of the fourth local communication terminal 107, the first local communication terminal 101 generates a non-held data transmission request signal, and transmits the generated non-held data transmission request signal to the fourth local communication terminal 107. Herein, the term "non-held data transmission request signal" is a signal for requesting the transmission of data corresponding to the non-held data. Accordingly, by transmitting a non-held data transmission request signal to another local communication terminal, an optional local communication terminal can request the transmission of non-held data thereof.

In step 435, a local communication terminal receiving the non-held data transmission request signal among the node local communication terminals 103, 105 and 107 detects all data held by the local communication terminal receiving the non-held data, and transmits all of the detected data to the first local communication terminal 101. Otherwise, the local communication terminal receiving the non-held data transmission request signal may find data corresponding to the non-held data from among all of the data held by the local communication terminal receiving the non-held data, and transmit the found data to the first local communication terminal 101.

For example, when receiving a non-held data transmission request signal, the fourth local communication terminal 107 can detect all data held by the fourth local communication terminal 107, and transmit all of the detected data to the first local communication terminal 101. As another example, when receiving a non-held data transmission request signal, the fourth local communication terminal 107 may detect only data corresponding to the non-held data from among all data held by the fourth local communication terminal 107, and transmit the detected data to the first local communication terminal 101.

In step 437, the first local communication terminal 101 receives the optional data as a response to the non-held data transmission request signal. If the received data includes the non-held data, the first local communication terminal 101 detects the non-held data from among the received data, and stores the detected non-held data therein. Otherwise, if the received data corresponds to the non-held data, by storing all of the received data therein, the first local communication terminal 101 holds all data held by the first, second, third, and fourth local communication terminals 101, 103, 105, and 107. Then, the first local communication terminal 101 detects both information on a data holding list for each local communication terminal and data held by the data holding list, and broadcasts the data holding list and the data to the node local communication terminals 103, 105, and 107.

In steps 439 to 443, by using the broadcasted information on the data holding list for each local communication terminal, each of the node local communication terminals 103, 105, and 107 checks non-held data. Then, each of the node local communication terminals 103, 105, and 107 finds data corresponding to the checked non-held data from among all of the broadcasted data held by the first, second, third, and fourth local communication terminals 101, 103, 105 and 107, and stores the found data therein.

In step 445, the first, second, third, and fourth local communication terminals 101, 103, 105, and 107 remove access to the LAN.

At step 433 through step 431, the first local communication terminal 101 detects information on a data holding list for each local communication terminal, and broadcasts the detected information on the data holding list for each local communication terminal to the second, third, and fourth local communication terminals 103, 105, and 107.

In steps 435 to 441, by using the information on the data holding list for each local communication terminal, each of the first, second, third, and fourth local communication terminals 101, 103, 105 and 107 checks non-held data, and finds a local communication terminal holding the checked non-held data from among the first, second, third, and fourth local communication terminals 101, 103, 105 and 107. When each of the first and second local communication terminals 101 and 103 holds all of the data held by the first, second, third, and fourth local communication terminals 101, 103, 105 and 107, the process proceeds to step 443.

In step 443, if non-held data of the third local communication terminal 105 corresponds to data held by the first local communication terminal 101, the third local communication terminal 105 transmits a non-held data transmission request signal to the first local communication terminal 101.

In step 445, when receiving the non-held data transmission request signal, the first local communication terminal 101 detects all data held by the first local communication terminal 101, and transmits all of the detected data to the third local communication terminal 105. Otherwise, the first local communication terminal 101 detects data corresponding to the non-held data of the third local communication terminal 105 from among all of the data held by the first local communication terminal 101, and transmits the detected data to the third local communication terminal 105.

Then, the third local communication terminal 105 receives the data from the first local communication terminal 101 as a response to the non-held data transmission request signal. If the received data includes the non-held data of the third local communication terminal 105, the third local communication terminal 105 detects the non-held data from among the received data, and stores the detected non-held data therein. Otherwise, if the received data corresponds to the non-held data of the third local communication terminal 105, by storing all of the received data therein, the third local communication terminal 105 holds all of the data held by the first, second, third, and fourth local communication terminals 101, 103, 105, and 107.

In step 447, when non-held data of the fourth local communication terminal 107 corresponds to data held by the third local communication terminal 105, the fourth local communication terminal 107 transmits a non-held data transmission request signal to the third local communication terminal 105.

In step 449, when receiving the non-held data transmission request signal, the third local communication terminal 105 detects all data held by the third local communication terminal 105, and transmits all of the detected data to the fourth local communication terminal 107. Then, the fourth local communication terminal 107 receives the data from the third local communication terminal 105 as a response to the non-held data transmission request signal. If the received data includes the non-held data of the fourth local communication terminal 107, the fourth local communication terminal 107 detects the non-held data from among the received data, and stores the detected non-held data therein. Otherwise, if the received data corresponds to the non-held data, by storing all of the received data therein, the fourth local communication terminal 107 holds all of the data held by the first, second, third, and fourth local communication terminals 101, 103, 105, and 107.

In step 451, the first, second, third, and fourth local communication terminals 101, 103, 105, and 107 remove access to the LAN.

While performing the steps as described above, the local communication terminals constructing the LAN receive/transmit data in an optimal communication scheme in response to a data holding ratio of the local communication terminals, so that they can share all of the data held by the local communication terminals with minimum time and network traffic.

Figure 5:
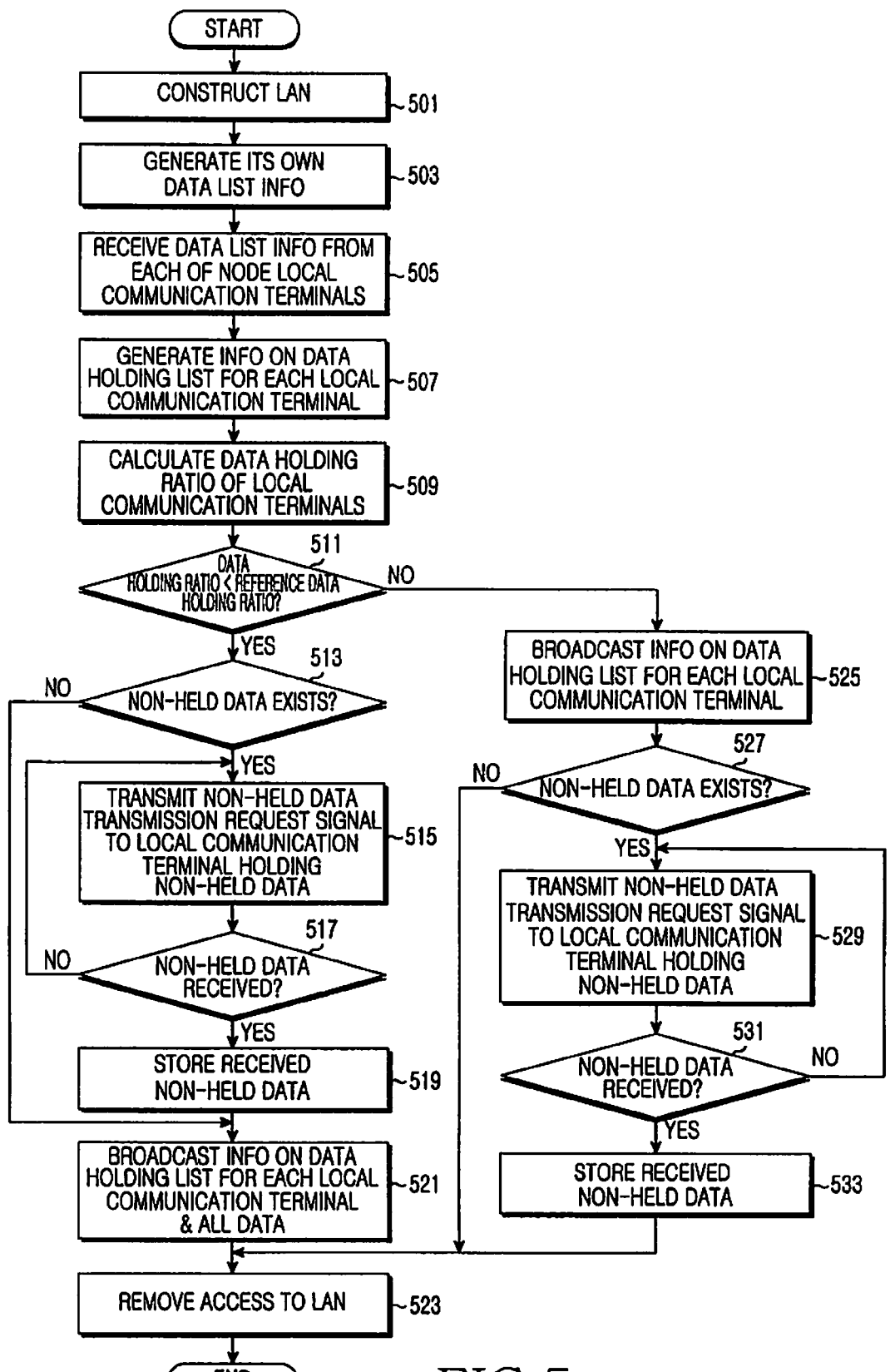
FIG. 5 is a flowchart illustrating data sharing of a coordinator with nodes in the LAN according to an exemplary embodiment of the present invention.

FIG. 5 is a flowchart illustrating data sharing of a coordinator with nodes in a LAN according to an exemplary embodiment of the present invention.

For a simple description of the exemplary embodiment of the present invention, among first, second, third, and fourth local communication terminals 101, 103, 105, and 107 constructing a LAN, the first local communication terminal 101 is assumed to be a coordinator of the LAN, and the second, third and fourth local communication terminals 103, 105, and 107 are assumed to be nodes of the LAN.

In step 501, the first local communication terminal 101 constructs a LAN along with local communication terminals located within a predetermined radius around it. In step 503, the first local communication terminal 101 generates data list information equivalent to data held by it. In step 505, the first local communication terminal 101 receives data list information from each of the second, third and fourth local communication terminals 103, 105, and 107. In step 507, the first local communication terminal 101 generates information on a data holding list for each local communication terminal by using data list information thereof and data list information of each of the second, third and fourth local communication terminals 103, 105, and 107.

In step 509, by using the information on the data holding list for each local communication terminal, the first local communication terminal 101 calculates a data holding ratio of the first, second, third, and fourth local communication terminals 101, 103, 105, and 107. In step 511, the first local communication terminal 101 compares the calculated data holding ratio with a predetermined reference data holding ratio. If it is determined that the calculated data holding ratio is less than the predetermined reference data holding ratio, the first local communication terminal 101 proceeds to step 513. However, if it is determined that the calculated data holding ratio is equal to or greater than the predetermined reference data holding ratio, the first local communication terminal 101 proceeds to step 525.

At step 513, by using the information on the data holding list for each local communication terminal, the first local communication terminal 101 determines whether non-held data of the first local communication terminal 101 exists among all data held by the first, second, third, and fourth local communication terminals 101, 103, 105, and 107. If it is determined in step 513 that the non-held data exists among all of the data held by the first, second, third, and fourth local communication terminals 101, 103, 105 and 107, the first local communication terminal 101 proceeds to step 515. However, if it is determined in step 513 that no non-held data exists among all of the data held by the first, second, third, and fourth local communication terminals 101, 103, 105 and 107, the first local communication terminal 101 proceeds to step 521.

At step 515, the first local communication terminal 101 transmits a non-held data transmission request signal to a local communication terminal holding the non-held data among the node local communication terminals 103, 105 and 107. In step 517, if it is determined that the first local communication terminal 101 receives data as a response to the non-held data transmission request signal, the first local communication terminal 101 proceeds to step 519. However, if it is determined in step 517 that the first local communication terminal 101 does not receive the data, the first local communication terminal 101 returns to step 515, and retransmits a non-held data transmission request signal.

At step 519, by storing the received data therein, the first local communication terminal 101 holds all of the data held by the first, second, third, and fourth local communication terminals 101, 103, 105, and 107. Then, the first local communication terminal 101 detects both information on a data holding list for each local communication terminal and data held by the first, second, third, and fourth local communication terminals 101, 103, 105 and 107, and broadcasts the first, second, third, and fourth local communication terminals 101, 103, 105 and 107 to the node local communication terminals 103, 105, and 107. In step 523, the first local communication terminal 101 removes access to the LAN.

At step 525, the first local communication terminal 101 finds the information on the data holding list for each local communication terminal, and transmits the found the first local communication terminal 101 to the node local communication terminals 103, 105, and 107. In step 527, by using the information on the data holding list for each local communication terminal, the first local communication terminal 101 determines whether non-held data exists among all data held by the first, second, third, and fourth local communication terminals 101, 103, 105, and 107. If it is determined in step 527 that the non-held data exists, the first local communication terminal 101 proceeds to step 529. However, if it is determined in step 527 that there exists no non-held data, the first local communication terminal 101 proceeds to step 523.

At step 529, the first local communication terminal 101 transmits a non-held data transmission request signal to a local communication terminal holding the non-held data among the node local communication terminals 103, 105 and 107. In step 531, if it is determined that the first local communication terminal 101 receives data as a response to the non-held data transmission request signal, the first local communication terminal 101 proceeds to step 533. However, if it is determined in step 531 that the first local communication terminal 101 does not receive the data, the first local communication terminal 101 returns to step 529, and retransmits a non-held data transmission request signal.

At step 533, by storing the received data therein, the first local communication terminal 101 holds all of the data held by the first, second, third, and fourth local communication terminals 101, 103, 105 and 107, and proceeds to step 523.

By performing the steps as described above, the first local communication terminal 101 can hold all of the data of the first, second, third, and fourth local communication terminals 101, 103, 105, and 107 with optimal time and network traffic.

Figure 6:
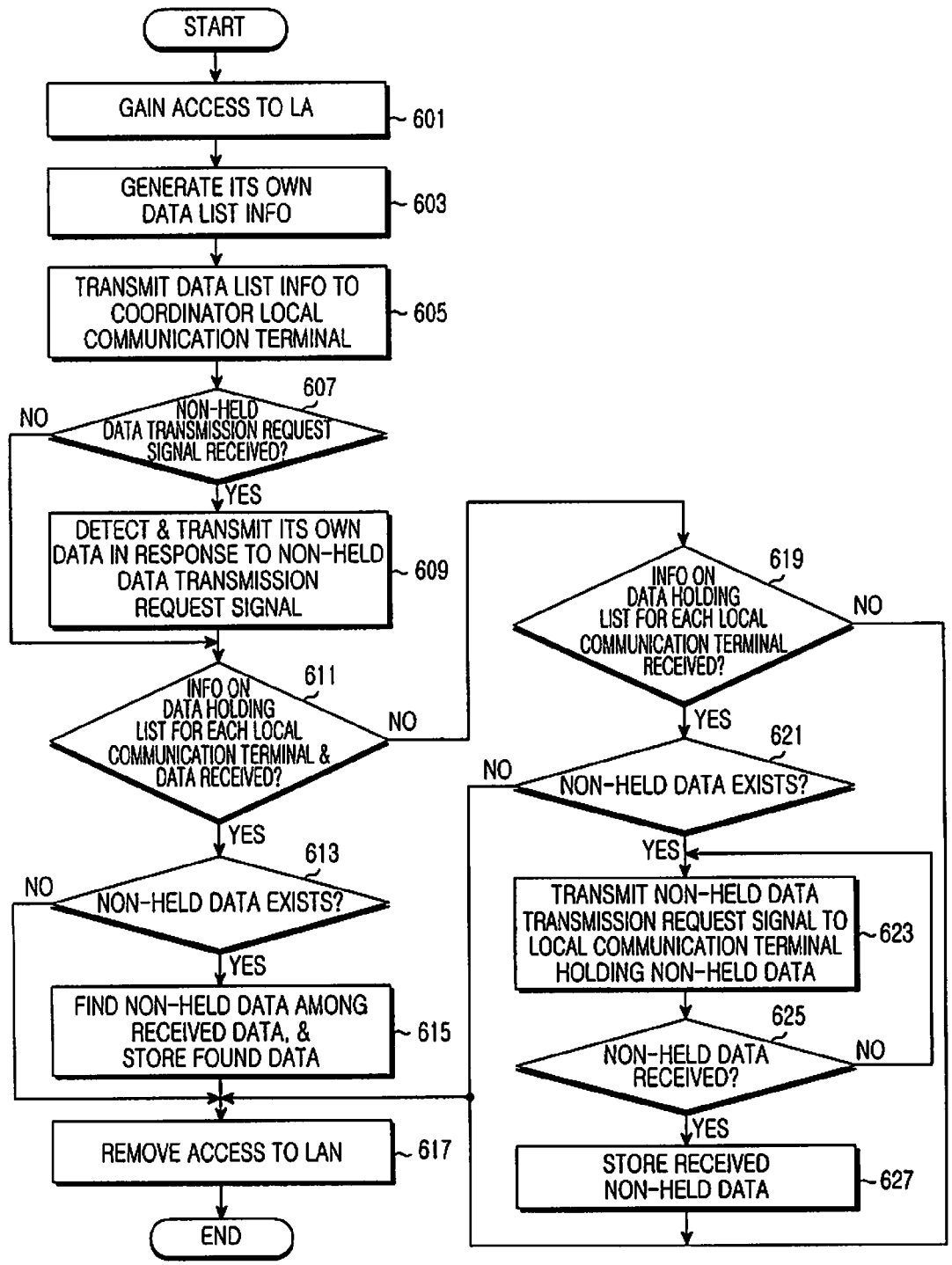
FIG. 6 is a flowchart illustrating sharing of data by nodes in the LAN according to an exemplary embodiment of the present invention.

FIG. 6 is a flowchart illustrating sharing of data by local communication terminals corresponding to nodes in a LAN according to an exemplary embodiment of the present invention.

For a simple description of the exemplary embodiment of the present invention, among first, second, third, and fourth local communication terminals 101, 103, 105, and 107 constructing a LAN, the first local communication terminal 101 is assumed to be a coordinator of the LAN, and the second, third and fourth local communication terminals 103, 105, and 107 are assumed to be nodes of the LAN. Also, a description of the exemplary embodiment of the present invention will be made from a viewpoint of the second local communication terminal 103 among the node local communication terminals 103, 105 and 107.

In step 601, the second local communication terminal 103 constructs a LAN along with the local communication terminals 101, 105, and 107 located within a predetermined radius around the second local communication terminal 103. In step 603, the second local communication terminal 103 generates data list information equivalent to currently stored data. In step 605, the second local communication terminal 103 transmits the generated data list information to the first local communication terminal 101. In step 607, the second local communication terminal 103 determines whether the second local communication terminal 103 receives a non-held data transmission request signal from the first, third, and fourth local communication terminals 101, 105, and 107. If it is determined in step 607 that the second local communication terminal 103 receives the non-held data transmission request signal, the second local communication terminal 103 proceeds to step 609. However, if it is determined in step 607 that the second local communication terminal 103 does not receive the non-held data transmission request signal, the second local communication terminal 103 proceeds to step 611.

At step 609, the second local communication terminal 103 detects data currently held by the second local communication terminal 103 in response to the received non-held data transmission request signal, and transmits the detected data to the local communication terminal that has transmitted the non-held data transmission request signal.

In step 611, if it is determined that the second local communication terminal 103 receives, from the first local communication terminal 101, both information on a data holding list for each local communication terminal and data held by the first, second, third, and fourth local communication terminals 101, 103, 105 and 107, the second local communication terminal 103 proceeds to step 613. However, if it is determined that the second local communication terminal 103 does not receive, from the first local communication terminal 101, both the information on the data holding list for each local communication terminal and the data held by the first, second, third, and fourth local communication terminals 101, 103, 105 and 107, the second local communication terminal 103 proceeds to step 619.

At step 613, by using the received information on the data holding list for each local communication terminal, the second local communication terminal 103 determines whether non-held data thereof exists among the data held by the first, second, third, and fourth local communication terminals 101, 103, 105, and 107. If it is checked in step 613 that there exists the non-held data, the second local communication terminal 103 proceeds to step 615. However, if it is checked in step 613 that there exists no non-held data, the second local communication terminal 103 proceeds to step 617.

At step 615, the second local communication terminal 103 detects data corresponding to the non-held data from among the received data held by the first, second, third, and fourth local communication terminals 101, 103, 105 and 107, and stores the detected data therein. At step 617, the second local communication terminal 103 removes access to the LAN.

At step 619, the second local communication terminal 103 determines whether the second local communication terminal 103 receives the information on the data holding list for each local communication terminal from the first local communication terminal 101. If it is determined in step 619 that the second local communication terminal 103 receives the information on the data holding list for each local communication terminal, the second local communication terminal 103 proceeds to step 621. However, if it is determined in step 619 that the second local communication terminal 103 does not receive the information on the data holding list for each local communication terminal, the second local communication terminal 103 proceeds to step 617.

At step 621, by using the received information on the data holding list for each local communication terminal, the second local communication terminal 103 determines whether non-held data thereof exists among the data held by the first, second, third, and fourth local communication terminals 101, 103, 105, and 107. If it is determined in step 621 that the non-held data exists, the second local communication terminal 103 proceeds to step 623. However, if it is determined in step 621 that no non-held data exists, the second local communication terminal 103 proceeds to step 617.

At step 623, the second local communication terminal 103 transmits a non-held data transmission request signal to a local communication terminal holding the non-held data among the first, third, and fourth local communication terminals 101, 105 and 107. In step 625, if it is determined that the second local communication terminal 103 receives data as a response to the transmitted non-held data transmission request signal, the second local communication terminal 103 proceeds to step 627. However, if it is determined in step 625 that the second local communication terminal 103 does not receive the data, the second local communication terminal 103 returns to step 623, and retransmits a non-held data transmission request signal.

At step 627, by storing the received data therein, the second local communication terminal 103 holds all of the data held by the first, second, third, and fourth local communication terminals 101, 103, 105 and 107, and proceeds to step 617.

By performing the steps as described above, each of the first, second, third, and fourth local communication terminals 101, 103, 105, and 107 can hold the data of the first, second, third, and fourth local communication terminals 101, 103, 105, and 107 with optimal time and network traffic.

Meanwhile, while the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims. For example, in the exemplary embodiment of the present invention, a coordinator local communication terminal from among local communication terminals constructing a LAN, which becomes a subject, generates information on a data holding list for each local communication terminal, and calculates a data holding ratio of the local communication terminals. Then, depending on each calculated data holding ratio, the coordinator local communication terminal broadcasts the information on the data holding list for each local communication terminal, or the information on the data holding list for each local communication terminal and data of the local communication terminals to other local communication terminals, so that the local communication terminals can share the data. However, any local communication terminal from among the coordinator local communication terminal and the node local communication terminals can perform the operation as described above. Also, in the exemplary embodiment of the present invention, while a LAN constructed by four local communication terminals is cited as an example, the present invention can also be applied to a LAN constructed by four or more local communication terminals.

Further, in the exemplary embodiment of the present invention, if the data holding ratio is greater than or equal to a reference data holding ratio, the information on whether to hold the shared data and the total shared data are broadcasted to a total of the terminals, but the shared data can be individually transmitted or unicasted to each terminal.

In the present invention as described above, when sharing data through the LAN, a transmission time and a traffic of data can be minimized, so that data can be optionally shared by the local communication terminals constructing the LAN with a relatively short transmission time.

What is claimed is:

1. A method for sharing data between at least two terminals over a Local Area Network (LAN), comprising the steps of:
   requesting for information on whether to hold shared data to a terminal connected to the LAN by a first terminal connected to the LAN;
   receiving the information on whether to hold the shared data from the terminal;
   collecting the information on whether to hold the shared data received from the terminal and identifying a degree of sharing using the collected information on whether to hold the shared data; and
   determining a method for transmitting the shared data according to the identified degree of sharing.

2. The method as claimed in claim 1, wherein identifying the degree of sharing comprises:
   calculating a total degree of sharing representing a degree of sharing between a total of the terminals connected to the LAN; and
   comparing the total degree of sharing with a predetermined reference degree of sharing.

3. The method as claimed in claim 1, wherein, in determining the method for transmitting the shared data, if the identified degree of sharing is lower than a predetermined degree of sharing, the shared data is broadcasted to the total of the terminals connected to the LAN.

4. The method as claimed in claim 1, wherein, in determining the method for transmitting the shared data, if the identified degree of sharing is greater than or equal to a predetermined degree of sharing, the shared data is individually transmitted to the terminal.

5. The method as claimed in claim 1, wherein, in determining the method for transmitting the shared data, if the identified degree of sharing is less than a predetermined degree of sharing, the collected information on whether to hold the shared data is unicasted or broadcasted to the terminal connected to the LAN.

6. The method as claimed in claim 5, wherein the degree of sharing is calculated using the collected information on whether to hold the shared data and is a degree obtained by dividing a current holding number of the data of a total of the terminals connected to the LAN for sharing the data by a maximum holding number of the data of the total terminals for sharing the data.

7. The method as claimed in claim 1, wherein the first terminal is an arbitrary terminal among the terminals connected to the LAN.

8. The method as claimed in claim 1, wherein the LAN is performed by any one of Zigbee specification-compliant communication, Bluetooth specification-compliant communication, and Ultra Wide Band (UWB) specification-compliant communication.

9. The method as claimed in claim 8, wherein, if the LAN is performed by Zigbee specification-compliant communication, the first terminal is a coordinator terminal.

10. The method as claimed in claim 1, wherein the shared data includes at least one of name card data, picture data, and address data.

11. A method for sharing data between at least two terminals over a LAN, comprising the steps of:
   receiving a request for information on whether to hold shared data from a first terminal connected to the LAN;
   transmitting the information on whether to hold shared data of a terminal to the first terminal according to the request;
   receiving the shared data of the terminal connected to the LAN from the first terminal and renewing the shared data held in a memory, wherein the shared data has collected information on whether to hold the shared data of a total of the terminals connected to the LAN;
   checking the shared data stored in the memory using the collected information on whether to hold the shared data; and
   according to the checked result, transmitting a message for requesting the shared data to another terminal holding the data that the terminal does not hold.

12. The method as claimed in claim 11, wherein transmitting the information on whether to hold the shared data of the terminal to the first terminal according to the request comprises:
   analyzing the request and determining a type of the shared data and a content of the shared data for every terminal for sharing the data;
   examining whether to hold shared data for every terminal according to the determined type and content of the shared data; and
   transmitting the information on whether to hold the shared data of the terminal to the first terminal.

13. The method as claimed in claim 11, wherein, in transmitting the information on whether to hold the shared data, the information on whether to hold the shared data is a value representing information on a telephone number of the terminal.

14. A first terminal, connected to a LAN for sharing data between at least two terminals over a LAN, for requesting for information on whether to hold the shared data to a terminal connected to the LAN, receiving the information on whether to hold the shared data from the terminal, collecting the information on whether to hold the shared data received from the terminal, identifying a degree of sharing using the collected information on whether to hold the shared data, and determining a method for transmitting the shared data according to the identified degree of sharing.

15. The first terminal as claimed in claim 14, wherein, in determining the method for transmitting the shared data, if the identified degree of sharing is lower than a predetermined degree of sharing, the shared data is broadcasted to a total of the terminals connected to the LAN.

16. The first terminal as claimed in claim 14, wherein, in determining the method for transmitting the shared data, if the identified degree of sharing is greater than or equal to a predetermined degree of sharing, the shared data is individually transmitted to the terminal.

17. The first terminal as claimed in claim 14, wherein, in determining the method for transmitting the shared data, if the identified degree of sharing is less than a predetermined degree of sharing, the collected information on whether to hold the shared data is unicasted or broadcasted to the terminal connected to the LAN.

18. The first terminal as claimed in claim 14, wherein the degree of sharing is calculated using the collected information on whether to hold the shared data and is the degree obtained by dividing a current holding number of the data of a total of the terminals connected to the LAN for sharing the data by a maximum holding number of the data of the total terminals for sharing the data.

19. The first terminal as claimed in claim 14, wherein the first terminal is an arbitrary terminal among the terminals connected to the LAN.

20. The first terminal as claimed in claim 14, wherein the LAN is performed by any one of Zibgee specification-compliant communication, Bluetooth specification-compliant communication, and Ultra Wide Band (UWB) specification-compliant communication.

21. The first terminal as claimed in claim 20, wherein, if the LAN is performed by Zigbee specification-compliant communication, the first terminal is a coordinator terminal.

22. A terminal for sharing data over a LAN connected to at least two terminals, receiving a request for information on whether to hold shared data of a first terminal connected to the LAN, transmitting information on whether to hold shared data of the terminal to the first terminal according to the request, detecting and storing data that the terminal does not hold among the shared data if receiving information on whether to hold shared data of a total of the terminals connected to the LAN together with shared data, requesting for the data that the terminal does not hold in the shared data to another terminal having the data that the terminal does not hold in the shared data if receiving information on whether to hold shared data of the total terminals, and receiving the data corresponding to the request from the terminal having the data that the terminal does not hold and storing the received data.

23. The terminal as claimed in claim 22, wherein, in transmitting the information on whether to hold the shared data of the terminal to the first terminal according to the request, the terminal analyzes the request and determines a type of shared data and a content of the shared data for every terminal for sharing the data, examines whether to hold the shared data of the terminal according to the determined type and content of the shared data, and transmits the information on whether to hold the shared data of the terminal to the first terminal.

24. The terminal as claimed in claim 22, wherein, in transmitting the information on whether to hold the shared data of the terminal, the information on whether to hold the shared data is a value representing information on a telephone number of the terminal.

* * * * *